(12) United States Patent
Agarwal et al.

(10) Patent No.: US 8,594,679 B2
(45) Date of Patent: Nov. 26, 2013

(54) METHODS, SYSTEMS, AND COMPUTER READABLE MEDIA FOR ROUTING A MESSAGE SERVICE MESSAGE THROUGH A COMMUNICATIONS NETWORK

(75) Inventors: Devesh Agarwal, Raleigh, NC (US); Peter Marsico, Chapel Hill, NC (US); Kedar Karmarkar, Morrisville, NC (US)

(73) Assignee: Tekelec Global, Inc., Morrisville, NC (US)

( * ) Notice: Subject to any disclaimer, the term of this patent is extended or adjusted under 35 U.S.C. 154(b) by 634 days.

(21) Appl. No.: 12/400,576

(22) Filed: Mar. 9, 2009

(65) Prior Publication Data
US 2009/0227276 A1 Sep. 10, 2009

Related U.S. Application Data

(60) Provisional application No. 61/034,760, filed on Mar. 7, 2008.

(51) Int. Cl.
*H04W 40/00* (2009.01)
(52) U.S. Cl.
USPC ........... 455/445; 455/428; 455/433; 455/466; 455/426.1
(58) Field of Classification Search
USPC ................. 455/445, 466, 433, 426.1, 428
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 4,819,156 A | 4/1989 | DeLorme et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,422,941 A | 6/1995 | Hasenauer et al. |

(Continued)

FOREIGN PATENT DOCUMENTS

| | | |
|---|---|---|
| CN | 1968267 A | 5/2007 |
| CN | 101385287 B | 3/2013 |

(Continued)

OTHER PUBLICATIONS

Notification of Transmittal of the International Search Report and The Written Opinion of the International Searching Authority, or the Declaration for International application No. PCT/US2009/036538 (Sep. 30, 2009).

(Continued)

*Primary Examiner* — Kamran Afshar
*Assistant Examiner* — Mong-Thuy Tran
(74) *Attorney, Agent, or Firm* — Jenkins, Wilson, Taylor & Hunt, P.A.

(57) ABSTRACT

Methods, systems, and computer readable media for routing a message service message through a communications network are disclosed. In one embodiment, the method includes, at a signaling node upstream from a sending party message server, receiving a message service message that includes a sending party identifier and a receiving party identifier. A number translation database is queried to determine a routing identifier associated with the receiving party identifier. The method also includes modifying the message service message to include the routing identifier, and routing the message service message to the sending party message server.

22 Claims, 6 Drawing Sheets

(56) References Cited

U.S. PATENT DOCUMENTS

| | | |
|---|---|---|
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,377,674 B1 | 4/2002 | Chong et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B1 | 8/2004 | Warkhede et al. |
| 6,795,701 B1 | 9/2004 | Baker et al. |
| 6,836,477 B1 | 12/2004 | West, Jr. et al. |
| 6,839,421 B2 | 1/2005 | Ferraro Esparza et al. |
| 6,871,070 B2 | 3/2005 | Ejzak |
| 6,873,849 B2 | 3/2005 | de la Red et al. |
| 6,885,872 B2 | 4/2005 | McCann et al. |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,010,002 B2 | 3/2006 | Chow et al. |
| 7,027,433 B2 | 4/2006 | Tuohino et al. |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,092,505 B2 | 8/2006 | Allison et al. |
| 7,170,982 B2 | 1/2007 | Li et al. |
| 7,221,952 B2 | 5/2007 | Cho et al. |
| 7,274,683 B2 | 9/2007 | Segal |
| 7,286,839 B2 | 10/2007 | McCann et al. |
| 7,366,530 B2 | 4/2008 | McCann et al. |
| 7,397,773 B2 | 7/2008 | Qu et al. |
| 7,415,007 B2 | 8/2008 | Huang |
| 7,457,283 B2 | 11/2008 | Dalton, Jr. et al. |
| 7,551,608 B1 | 6/2009 | Roy |
| 7,627,108 B1 | 12/2009 | Enzmann et al. |
| 7,664,495 B1 | 2/2010 | Bonner et al. |
| 7,693,135 B2 | 4/2010 | Pershan |
| 7,715,367 B2 | 5/2010 | Nishida et al. |
| 7,746,864 B1 | 6/2010 | Asawa et al. |
| 7,751,386 B2 | 7/2010 | Kobayashi et al. |
| 7,756,518 B2 | 7/2010 | Xu et al. |
| 7,787,445 B2 | 8/2010 | Marsico |
| 7,787,878 B2 | 8/2010 | Li et al. |
| 7,805,532 B2 | 9/2010 | Pattison et al. |
| 7,860,231 B2 | 12/2010 | Florkey et al. |
| 7,889,716 B2 | 2/2011 | Tejani et al. |
| 7,948,978 B1 | 5/2011 | Rogers et al. |
| 7,984,130 B2 | 7/2011 | Bogineni et al. |
| 7,996,541 B2 | 8/2011 | Marathe et al. |
| 8,027,319 B2 | 9/2011 | Chin et al. |
| 8,184,798 B2 | 5/2012 | Waitrowski et al. |
| 8,224,337 B2 | 7/2012 | Gosnell et al. |
| 8,254,551 B2 | 8/2012 | Heinze et al. |
| 8,452,325 B2 | 5/2013 | McCann |
| 2001/0008532 A1 | 7/2001 | Lee |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0055380 A1 | 12/2001 | Benedyk et al. |
| 2002/0054674 A1 | 5/2002 | Chang et al. |
| 2002/0095421 A1 | 7/2002 | Koskas |
| 2002/0114440 A1 | 8/2002 | Madour et al. |
| 2002/0122547 A1 | 9/2002 | Hinchey et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2002/0176562 A1 | 11/2002 | Hao |
| 2003/0007482 A1 | 1/2003 | Khello et al. |
| 2003/0013464 A1 | 1/2003 | Jean Henry-Labordere |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0095541 A1 | 5/2003 | Chang et al. |
| 2003/0109271 A1 | 6/2003 | Lewis et al. |
| 2003/0128693 A1 | 7/2003 | Segal |
| 2003/0181206 A1 | 9/2003 | Zhou et al. |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0053604 A1 | 3/2004 | Ratilainen et al. |
| 2004/0053610 A1 | 3/2004 | Kim |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |

(56) References Cited

U.S. PATENT DOCUMENTS

| | | |
|---|---|---|
| 2004/0125925 A1 | 7/2004 | Marsot |
| 2004/0141488 A1 | 7/2004 | Kim et al. |
| 2004/0142707 A1 | 7/2004 | Midkiff et al. |
| 2004/0196963 A1 | 10/2004 | Appelman et al. |
| 2004/0198351 A1 | 10/2004 | Knotts |
| 2004/0202187 A1 | 10/2004 | Kelly et al. |
| 2004/0243596 A1 | 12/2004 | Lillqvist et al. |
| 2004/0246965 A1 | 12/2004 | Westman et al. |
| 2005/0100145 A1 | 5/2005 | Spencer et al. |
| 2005/0101297 A1 | 5/2005 | Delaney et al. |
| 2005/0119017 A1 | 6/2005 | Lovell, Jr. et al. |
| 2005/0143075 A1 | 6/2005 | Halsell |
| 2005/0182781 A1 | 8/2005 | Bouvet |
| 2005/0251509 A1 | 11/2005 | Pontius |
| 2005/0286531 A1 | 12/2005 | Tuohino et al. |
| 2006/0002308 A1 | 1/2006 | Na et al. |
| 2006/0034256 A1 | 2/2006 | Addagatla et al. |
| 2006/0034270 A1 | 2/2006 | Haase et al. |
| 2006/0067338 A1 | 3/2006 | Hua et al. |
| 2006/0072726 A1 | 4/2006 | Klein et al. |
| 2006/0077957 A1 | 4/2006 | Reddy et al. |
| 2006/0095575 A1 | 5/2006 | Sureka et al. |
| 2006/0098621 A1 | 5/2006 | Plata et al. |
| 2006/0136557 A1 | 6/2006 | Schaedler et al. |
| 2006/0165068 A1 | 7/2006 | Dalton et al. |
| 2006/0225128 A1 | 10/2006 | Aittola et al. |
| 2006/0245573 A1 | 11/2006 | Sheth et al. |
| 2006/0293021 A1 | 12/2006 | Zhou |
| 2007/0019625 A1 | 1/2007 | Ramachandran et al. |
| 2007/0061397 A1 | 3/2007 | Gregorat et al. |
| 2007/0104184 A1 | 5/2007 | Ku et al. |
| 2007/0115934 A1 | 5/2007 | Dauster et al. |
| 2007/0116250 A1 | 5/2007 | Stafford |
| 2007/0121879 A1 | 5/2007 | McGary et al. |
| 2007/0133574 A1 | 6/2007 | Tejani et al. |
| 2007/0133757 A1 | 6/2007 | Girouard et al. |
| 2007/0153995 A1 | 7/2007 | Fang et al. |
| 2007/0191003 A1* | 8/2007 | Smith et al. ............... 455/428 |
| 2007/0203909 A1 | 8/2007 | Marathe |
| 2007/0238465 A1* | 10/2007 | Han et al. ............... 455/445 |
| 2007/0243876 A1* | 10/2007 | Duan ............... 455/445 |
| 2007/0258575 A1 | 11/2007 | Douglas et al. |
| 2007/0286379 A1 | 12/2007 | Wiatrowski et al. |
| 2008/0013533 A1 | 1/2008 | Bogineni et al. |
| 2008/0019356 A1 | 1/2008 | Marsico |
| 2008/0037759 A1 | 2/2008 | Chin et al. |
| 2008/0081754 A1 | 4/2008 | Plemons et al. |
| 2008/0084975 A1 | 4/2008 | Schwartz |
| 2008/0109532 A1 | 5/2008 | Denoual et al. |
| 2008/0112399 A1 | 5/2008 | Cohen et al. |
| 2008/0114862 A1 | 5/2008 | Moghaddam et al. |
| 2008/0130856 A1 | 6/2008 | Ku et al. |
| 2008/0137832 A1 | 6/2008 | Heinze et al. |
| 2008/0171544 A1 | 7/2008 | Li et al. |
| 2008/0247526 A1 | 10/2008 | Qiu et al. |
| 2008/0281975 A1 | 11/2008 | Qiu et al. |
| 2008/0311917 A1 | 12/2008 | Marathe et al. |
| 2009/0022146 A1 | 1/2009 | Huang |
| 2009/0043704 A1 | 2/2009 | Bantukul et al. |
| 2009/0074174 A1 | 3/2009 | Allen et al. |
| 2009/0103707 A1 | 4/2009 | McGary et al. |
| 2009/0193071 A1 | 7/2009 | Qiu et al. |
| 2009/0264112 A1 | 10/2009 | De Zen et al. |
| 2010/0020728 A1 | 1/2010 | Jefferson et al. |
| 2010/0042525 A1 | 2/2010 | Cai et al. |
| 2010/0177780 A1 | 7/2010 | Ophir et al. |
| 2010/0285800 A1 | 11/2010 | McCann |
| 2010/0299451 A1 | 11/2010 | Yigang et al. |
| 2011/0098049 A1 | 4/2011 | Gosnell et al. |
| 2011/0116382 A1 | 5/2011 | McCann et al. |
| 2011/0126277 A1 | 5/2011 | McCann et al. |

FOREIGN PATENT DOCUMENTS

| | | |
|---|---|---|
| EP | 0 512 962 A2 | 11/1992 |
| EP | 0 669 771 A1 | 8/1995 |
| EP | 0 936 825 A3 | 8/1999 |
| EP | 0 944 276 A1 | 9/1999 |
| EP | 1 285 545 B1 | 10/2004 |
| EP | 1 558 004 A | 7/2005 |
| EP | 1 742 452 A1 | 1/2007 |
| EP | 1 282 983 B1 | 8/2010 |
| EP | 1 958 399 B1 | 2/2012 |
| KR | 2000-0037801 | 7/2000 |
| KR | 10-1998-0052565 | 5/2001 |
| KR | 2003-0040291 A1 | 5/2003 |
| KR | 10-2004-0107271 A | 12/2004 |
| KR | 10-2007-0061774 | 6/2007 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 00/60821 | 10/2000 |
| WO | WO 01/47297 A2 | 6/2001 |
| WO | WO 01/48981 A1 | 7/2001 |
| WO | WO 01/54444 A1 | 7/2001 |
| WO | WO 03/005664 A2 | 1/2003 |
| WO | WO 03/021982 A1 | 3/2003 |
| WO | WO 03/105382 A1 | 12/2003 |
| WO | WO 2004/006534 | 1/2004 |
| WO | WO 2004/087686 A | 1/2004 |
| WO | WO 2004/075507 | 9/2004 |
| WO | WO 2004/102345 A2 | 11/2004 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/146257 A2 | 12/2007 |
| WO | WO 2008/011101 A2 | 1/2008 |
| WO | WO 2008/073226 | 6/2008 |
| WO | WO 2008/157213 A2 | 12/2008 |
| WO | WO 2009/018418 A2 | 2/2009 |
| WO | WO 2009/023573 A2 | 2/2009 |
| WO | WO 2009/070179 A1 | 6/2009 |
| WO | WO 2011/047382 A2 | 4/2011 |

OTHER PUBLICATIONS

Supplementary European Search Report for European application No. 04751843.6 (Aug. 7, 2009).

Communication pursuant to Article 94(3) EPC for European application No. 06844747.3 (Jul. 28, 2009).

Official Action for U.S. Appl. No. 11/291,502 (May 13, 2009).

Notification of Transmittal of the International Search Report and the Written Opinion of the International Searching Authority, or the Declaration for International Application No. PCT/US2008/072641 (Feb. 24, 2009).

Notification of Transmittal of the International Search Report and the Written Opinion of the International Searching Authority, or the Declaration for International Application No. PCT/US2008/066675 (Dec. 9, 2008).

Notice of Allowance for U.S. Appl. No. 10/729,519 (Jul. 30, 2007).

"IP Multimedia Subsystem," printout from wikipedia.org, Wikimedia Foundation, Inc. (May 29, 2007).

Official Action for U.S. Appl. No. 10/729,519 (Nov. 28, 2006).

Notification Concerning Transmittal of International Preliminary Report on Patentability for International Application No. PCT/US2004/024328 (Jul. 20, 2006).

"HP OperCall Home Subscriber Server Software—Data Sheet", 4AA0-3360ENW Rev. 2, Hewlett-Packard Development Company, L.P. (Jul. 2006).

Notice of Allowance for U.S. Appl. No. 10/631,586 (May 25, 2006).

Notification of Transmittal of the International Search Report, or the Declaration and Written Opinion of the International Searching Authority for International Application No. PCT/US2004/024328 (Apr. 25, 2006).

(56) References Cited

OTHER PUBLICATIONS

Supplemental Notice of Allowance for U.S. Appl. No. 09/747,070 (Feb. 10, 2006).
Notice of Allowance for U.S. Appl. No. 09/747,070 (Dec. 2, 2005).
Interview Summary for U.S. Appl. No. 09/747,070 (Dec. 2, 2005).
Advisory Action for U.S. Appl. No. 09/747,070 (Nov. 1, 2005).
Official Action for U.S. Appl. No. 10/631,586 (Oct. 26, 2005).
Notice of Allowance for U.S. Appl. No. 10/166,968 (Sep. 20, 2005).
Notice of Allowance for U.S. Appl. No. 09/471,946 (Oct. 15, 2004).
Final Official Action for U.S. Appl. No. 09/747,070 (May 11, 2005).
Official Action for U.S. Appl. No. 09/747,070 (Jun. 30, 2004).
Supplemental Notice of Allowability for U.S. Appl. No. 09/471,946 (May 24, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Notice of Allowance and Fee(s) Due for U.S. Appl. No. 09/471,946 (Feb. 6, 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Official Action from European Patent Office in courterpart European Patent Application (Dec. 11, 2003).
Interview Summary for U.S. Appl. No. 09/471,946 (Dec. 9, 2003).
Communication pursuant to Article 96(2) EPC for European Application No. 00988270.5 (Nov. 12, 2003).
Notification of Transmittal of the International Search Report or the Declaration for International Application No. PCT/US2003/018266 (Oct. 31, 2003).
Office Communication for U.S. Appl. No. 09/759,743 (Oct. 20, 2003).
Official Action for U.S. Appl. No. 09/471,946 (Jul. 9, 2003).
Moodie, "Agilent acceSS7: White Paper," Agilent Technologies, pp. 1-14 (Apr. 1, 2003).
Notice of Allowance and Fee(s) Due for U.S. Appl. No. 09/759,743 (Mar. 10, 2003).
Interview Summary for U.S. Appl. No. 09/759,743 (Feb. 27, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Final Official Action for U.S. Appl. No. 09/759,743 (Dec. 2, 2002).
Barry, "A Signal for Savings," Packet, Cisco Systems Users Magazine, vol. 14, No. 4, pp. Cover; 19-21; and 81 (Fourth Quarter 2002).
Interview Summary for U.S. Appl. No. 09/759,743 (Sep. 13, 2002).
Official Action for U.S. Appl. No. 09/759,743 (May 23, 2002).
Interview Summary for U.S. Appl. No. 09/759,743 (Mar. 6, 2002).
"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).
"Next-Generation SS7 Networks with the Cisco IP Transfer Point," Cisco Systems, Inc., pp. 1-14 (Copyright 1992-2002).
Notification of Transmittal of International Preliminary Examination Report for International Application No. PCT/US1999/030861 (Dec. 28, 2001).
Official Action for U.S. Appl. No. 09/759,743 (Dec. 3, 2001).
International Preliminary Examination Report for International Application No. PCT/US01/01052 (Nov. 7, 2001).
The attached email dated Oct. 20, 2001 and PowerPoint presentation dated Oct. 24, 2001 disclose an MSISDN-based auto-provisioning solution proposed by a customer of the assignee of the presend application.
"Agilent acceSS7 Business intelligence," Agilent Technologies, pp. 1-6 (Copyright 2001-Printed in the UK Nov. 30, 2001).
International Search Report for International Application No. PCT/US00/34924 (May 16, 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
Rockhold, "Or," Wireless Review, p. 22, 23, 26, 28, 30, 32, (Aug. 15, 2000).
Notification of Transmittal of the International Search Report or the Declaration for International Application No. PCT/US1999/030861 (Mar. 17, 2000).
"Topsail Beach-SS7 Over IP-" Cisco Systems, Inc., pp. 1-16 (Copyright 1999).
Etsi, "Digital Cellular Telecommunications Systems (Phase 2++); Support of Mobile Number Portability (MNP); Technical Realisation; Stage 2," Global System for Mobile Communications, p. 1-71, (1998).
Smith, "Number Portability Pileup," Telephony, p. 22, 24, 26, (Jan. 6, 1997).
Jain et al., "Phone Number Portability for PCS Systems with ATM Backbones Using Distributed Dynamic Hashing," IEEE, vol. 15 (No. 1), p. 96-105, (Jan. 1997).
Heinmiller, "Generic Requirements for SCP Application and GTT Function for Number Portability," Illinois Number Portability Workshop, p. 1-50, (Sep. 4, 1996).
International Telecommunication Union, "Series Q: Switching and Signalling: Specifications of Signalling Systems No. 7-Signalling Connection Control Part," p. 11-16, (Jul. 1996).
Rice, "SS7 Networks in a PCS World," Telephony, pp. 138, 140 142, 144, 146, (Jun. 24, 1996).
Tekelec, "Eagle STP Planning Guide", Eagle Network Switching Division, (No. 3), p. i-vii, 1-64, A1-A2, B1-2, (May 1996).
Anonymous, "Generic Switching and Signaling Requirements for Number Portability," AT&T Network Systems, No. 1, p. 1-75, (Feb. 2, 1996).
Etsi, Digital Cellular Telecommunications System (Phase 2+); Milbe Application Part (MAP) Specification, Global System for Mobile Communications, pp. 112-114 (1996).
Jain, et al., "A Hashing Scheme for Phone Number Portability in PCS Systems with ATM Backbones," Bell Communications Research, p. 593-597, (1996).
Bishop, "Freeing the Network for Competition," Telecommunications, p. 75-80, (Apr. 1995).
Anonymous, "Zeichengabesysteme-Eine neue Generation für ISDN und intelligente Netze," Zeichengabesystem, Medien-Institut Bremen, p. iz-xi; 170-176, (Feb. 17, 1995).
Giordano et al., "PCS Number Portability," IEEE, p. 1146-1150, (Sep. 1994).
Bellcore, "Signaling Transfer Point (STP) Generic Requirements," Bell Communications Research, No. 1, p. ii-xxii, 4-84-J14, (Jun. 1994).
Telcordia Technologies, "CCS Network interface Specification (CCSNIS) Supporting SCCP and TCAP," Bell Communications Research, p. ii-xii, 1-1—C-22, (Mar. 1994).

(56) References Cited

OTHER PUBLICATIONS

Buckles, "Very High Capacity Signaling Trnsfer Point for Intelligent Network Servcies," DSC Communciations Corporation, p. 1308-1311, (1988).
"Diameter Overview," referenced from www.ulticom.com/html/products/signalware-diameter-reference-guide.asp (Publication date unknown).
"Chapter 1: Overview," SS7 Port Adapter Installation and Configuration, pp. 1-1-1-8 (Publication Date Unknown).
"Configuring ITP Basic Functionally," IP Transfer Point, Cisco IOS Release 12.2(4)MB12, pp. 31-50 (Publication Date Unknown).
"Configuring ITP Optional Features," IP Transfer Point, Cisco IOS Release 12.294)MB12, pp. 65-136 (Publication Date Unknown).
"Configuring M3UA and SUA SS7 Over IP Signaling Gateways," IP Transfer Point, Cisco IOS Release 12.2(4)MB13, pp. 51-66 (Publication Date Unknown).
"Configuring M3UA and SUA SS7 Over IP Signaling Gateways," IP Transfer Point, Cisco IOS Release 12.2(4)MB10, pp. 49-62 (Publication Date Unknown).
Final Official Action for U.S. Appl. No. 11/635,406 (Apr. 5, 2011).
Notice of Allowance and Fee(s) Due for U.S. Appl. No. 11/888,907 (Apr. 1, 2011).
Official Action for U.S. Appl. No. 11/982,549 (Feb. 24, 2011).
"Ericsson Unified Number Portability," (Downloaded from the Internet on Jan. 24, 2011).
Chinese Official Action for Chinese Patent Application No. 200680051295.9 (Dec. 24, 2010).
Notification of Transmittal of the International Search Report and the Written Opinion of the International Searching Authority, or the Declaration for International Application No. PCT/US2010/034372 (Nov. 30, 2010).
Notice of Allowance and Fee(s) Due for U.S. Appl. No. 11/291,502 (Oct. 5, 2010).
Official Action for U.S. Appl. No. 11/888,907 (Sep. 16, 2010).
Communication pursuant to Article 94(3) EPC for European application No. 07810606.9 (Aug. 26, 2010).
Official Action for U.S. Appl. No. 11/635,406 (Aug. 26, 2010).
Communication pursuant to Article 94(3) EPC for European application No. 03734522.0 (Aug. 19, 2010).
Tsou et al., "Realm-Based Redirection in Diameter," draft-ietf-dime-realm-based-redirect-03, RFC 3588, pp. 1-6 (Jul. 12, 2010).
Communication Pursuant to Article 94(3) EPC for European Application No. 06844747.3 (May 11, 2010).
Notice of Allowance and Fee(s) Due for U.S. Appl. No. 11/879,737 (Apr. 22, 2010).
Interview Summary for U.S. Appl. No. 11/364,759 (Apr. 21, 2010).
"3rd Generation Partnership Project; Technical Specification Group Core Network and Terminals; Policy and Charging Control signalling flows and Quality of Service (QoS) parameter mapping (Release 9)," 3GPP TS 29.213, V9.2.0, pp. 1-129 (Mar. 2010).
Supplemental European Search Report for European application No. 03734522.0 (Feb. 23, 2010).
Communication pursuant to Article 94(3) EPC for European application No. 07810606.9 (Feb. 12, 2010).
Final Official Action for U.S. Appl. No. 11/291,502 (Feb. 4, 2010).
Final Official Action for U.S. Appl. No. 11/364,759 (Jan. 21, 2010).
Korhonen et al., "Clarifications on the Routing of Diameter Requests Based on the Username and the Realm," RFC 5729, pp. 1-9 (Dec. 2009).
Supplementary European Search Report for European application No. 07810606.9 (Nov. 23, 2009).
Supplementary European Search Report for European Patent No. 1676386 (Oct. 30, 2009).
Non-Final Official Action for U.S. Appl. No. 11/879,737 (Sep. 30, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).

Communication of European publication number and information on the application of Article 67(3) EPC for European application No. 0786756637 (Aug. 12, 2009).
Notification Concerning Transmittal of International Preliminary Report on Patentability for International Application No. PCT/US2007/024418 (Jun. 18, 2009).
Final Official Action for U.S. Appl. No. 11/879,737 (Jun. 9, 2009).
Supplementary European Search Report for European Application No. 06844747.3 (Apr. 24, 2009).
Communication of European publication number and information on the application of Article 67(3) EPC for European Application No. 07810606.9 (Mar. 18, 2009).
Notification of Transmittal of the International Search Report and the Written Opinion of the International Searching Authority, or the Declaration for International Application No. PCT/US07/16370 (Sep. 15, 2008).
Official Action for U.S. Appl. No. 11/879,737 (Sep. 15, 2008).
Notification of Transmittal of the International Search Report and the Written Opinion of the International Searching Authority, or the Declaration for International Application No. PCT/US07/24418 (May 1, 2008)
"3rd Generation Partnership Project; Technical Specification Group Services and System Aspects; Policy and charging control architecture (Release 8)," 3GPP TS 23.203, V8.1.1, pp. 1-87 (Mar. 2008).
Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).
Notification of European publication number and information on the application of Article 67(3) EPC for European Application No. 04751843.6 (Dec. 29, 2005).
Notification of European Publication Number and Information on the Application of Article 67(3) EPC for European Application No. 03734522.0 (Mar. 23, 2005).
Schwarz, "ENUM Trial to Link Phone, Internet Addresses," (Mar. 22, 2005).
Peterson, "Telephone Number Mapping (ENUM) Service Registration for Presence Services," Network Working Group, RFC 3953 (Jan. 2005).
Jones, "The Definitive Guide to Scaling Out SQL Server," http://www.snip.gob.ni/Xdc/SQL/DGSOSSFinal.pdf (Retrieved on Aug. 16, 2010) (2005).
3GPP, "3rd Generation Partership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers With the Session Initiation Protocol (SIP)," Network Working Group, RFC 3824, pp. 1-14 (Jun. 2004).
Cisco, "Quality of Service Networks," Internetworking Technologies Handbook, Chapter 49, pp. 49-1-49-32 (Sep. 11, 2003).
Foster et al., "Number Portability in the Global Switched Telephone Network (GSTN): An Overview," Network Working Group, RFC 3482 (Feb. 2003).
"Global Implementation of ENUM: A Tutorial Paper," International Telecommunication Union, Telecommunication Standardization Union, Study Group 2, (Feb. 8, 2002).
Mealling, "The Naming Authority Pointer (NAPTR) DNS Resource Record," Network Working Group, RFC 2915 (Sep. 2000).
Neustar, "ENUM: Driving Convergence in the Internet Age," pp. 1-5 (Publication Date Unknown).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Communication of European publication number and information on the application of Article 67(3) EPC for Application No. 06844747.3 (Jul. 23, 2008).
Notice of Allowance and Fee(s) Due for U.S. Appl. No. 11/112,126 (Mar. 28, 2008).

(56) References Cited

OTHER PUBLICATIONS

Notice of Allowance and Fee(s) Due for U.S. Appl. No. 11/112,126 (Dec. 17, 2007).
Official Action for U.S. Appl. No. 11/112,126 (Jun. 15, 2007).
Communication pursuant to Rules 109 and 110 EPC for European Application No. 04751843.6 (Dec. 16, 2005).
Notification Concerning Transmittal of International Preliminary Report on Patentability (Chapter I of the Patent Cooperation Treaty) in International Application No. PCT/US2004/014645 (Nov. 24, 2005).
Supplemental Notice of Allowance and Fee(s) Due for U.S. Appl. No. 10/842,394 (Feb. 9, 2005).
Notification of Transmittal of the International Search Report and the Written Opinion of the International Searching Authority, or the Declaration for International Application No. PCT/US2004/014645 (Dec 16, 2004).
Notice of Allowance and Fee(s) Due for U.S. Appl. No. 10/842,394 (Dec. 15, 2004).
Notification of Transmittal of the International Search Report and the Written Opinion of the International Searching Authority, or the Declaration for International Application No. PCT/US04/06247 (Nov. 10, 2004).
Interview Summary for U.S. Appl. No. 12/906,816 (Jan. 27, 2012).
Decision to Grant a European Patent Pursuant to Article 97(1) EPC for European Patent Application No. 06844747.3 (Jan. 19, 2012).
Extended European Search Report for European Application No. 08725747.3 (Dec. 23, 2011).
Communication Pursuant to Article 94(3) EPC for Eurpoean Patent Application No. 04751843.6 (Dec. 15, 2011).
Final Official Action for U.S. Appl. No. 11/635,406 (Nov. 30, 2011).
Interview Summary for U.S. Appl. No. 11/982,549 (Nov. 28, 2011).
Second Office Action for Chinese Patent Application No. 200680051295.9 (Oct. 9, 2011).
Non-Final Official Action for U.S. Appl. No. 12/906,816 (Oct. 5, 2011).
Notice of Panel Decision from Pre-Appeal Brief Review for U.S. Appl. No. 11/635,406 (Oct. 3, 2011).
Official Action for U.S. Appl. No. 12/883,886 (Sep. 30, 2011).
Non-Final Official Action for U.S. Appl. No. 12/906,998 (Sep. 21, 2011).
Final Official Action for U.S. Appl. No. 11/605,837 (Sep. 16, 2011).
Final Official Action for U.S. Appl. No. 11/982,549 (Aug. 31, 2011).
Official Action for U.S. Appl. No. 11/731,772 (Aug. 24, 2011).
Notice of Abandonment for U.S. Appl. No. 11/731,800 (Aug. 3, 2011).
Communication under Rule 71(3) EPC for European Application No. 06 844 747.3 (Jul. 19, 2011).
Notification of Transmittal of the International Search Report and the Written Opinion of the International Searching Authority, or the Declaration for International Application No. PCT/US2010/053062 (Jun. 28, 2011).
Notice of Publication of Abstract for Indian Patent Application No. 6406/CHENP/2010 A (Jun. 17, 2011).
First Office Action for Chinese Patent Application No. 200780034804.1 (May 19, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.4.0, pp. 1-71 (Sep. 2009).
Jones et al., "Diameter Command Code Registration for the Third Generation Partnership Project (3GPP) Evolved Packet System (EPS)," Network Working Group, RFC 5516, pp. 1-5 (Apr. 2009).
Tschofenig et al., "Securing the Next Steps in Signaling (NSIS) Protocol Suite," International Journal of Internet Protocol Technology, vol. 1, pp. 1-14 (2006).
Stiemerling et al., "NAT/Firewall NSIS Signaling Layer Protocol (NSLP)," draft-ietf-nsis-nslp-natfw-06, pp. 1-70 (May 16, 2005).
Calhoun et al., "Diameter Base Protocol," RFC 3588, pp. 1-90 (Sep. 2003).
Non-Final Official Action for U.S. Appl. No. 12/777,853 (Aug. 29, 2012).
Notice of Loss of Rights Pursuant to Rule 112(1) EPC for European Patent Application No. 07867566.7 (Jul. 31, 2012).
First Official Action for Chinese Patent Application No. 200880103119.4 (Jul. 4, 2012).
Advisory Action for U.S. Appl. No. 12/906,816 (Jun. 5, 2012).
Notice of Allowance and Fee(s) Due for U.S. Appl. No. 11/635,406 (Apr. 20, 2012).
Final Official Action for U.S. Appl. No. 12/906,998 (Mar. 29, 2012).
Third Office Action for Chinese Patent Application No. 200680051295.9 (Mar. 20, 2012).
Notice of Allowance and Fee(s) Due for U.S. Appl. No. 12/883,886 (Mar. 16, 2012).
Advisory Action for U.S. Appl. No. 11/635,406 (Mar. 14, 2012).
Interview Summary for U.S. Appl. No. 11/635,406 (Mar. 7, 2012).
Final Official Action for U.S. Appl. No. 12/906,816 (Feb. 21, 2012).
Notice of Allowance and Fee(s) Due for U.S. Appl. No. 11/605,837 (Jan. 20, 2012).
Applicant-Initiated Interview Summary for U.S. Appl. No. 12/906,816 (May 17, 2012).
Second Office Action for Chinese Patent Application No. 200780034804.1. (Feb. 21, 2012).
Decision of Rejection for Chinese Application No. 200880110878.3 (May 31, 2013).
Notice of Allowance and Fee(s) Due for U.S. Appl. No. 11/982,549 (May 17, 2013).
Second Office Action for Chinese Application No. 200880103119.4 (Mar. 19, 2013).
Notice of Allowance and Fee(s) Due for U.S. Appl. No. 12/777,853 (Feb. 7, 2013).
First Examination Report for Indian Application No. 3231/CHENP/2008 (Jan. 2, 2013).
Non-Final Office Action for U.S. Appl. No. 12/906,998 (Jan. 2, 2013).
Communication Under Rule 71(3) EPC for European Patent Application No. 04779394.8 (Dec. 18, 2012).
Notice of Granting Patent Right for Invention for Chinese Patent Application No. 200680051295.9 (Nov. 6, 2012).
Decision of Rejection for Chinese Patent Application No. 200780034804.1 (Aug. 31, 2012).
First Office Action for Chinese Patent Application No. 200880110878.3 (Aug. 27, 2012).
Communication of European publication number and information on the application of Article 67(3) EPC for European Application No. 10824243.9 (Jul. 25, 2012).
Loshin, "19.4: Network Address Translation," TCP/IP Clearly Explained, Fourth Edition, Morgan Kaufman Publishers, pp. 435-437 (2003).

\* cited by examiner

METHODS, SYSTEMS, AND COMPUTER READABLE MEDIA FOR ROUTING A MESSAGE SERVICE MESSAGE THROUGH A COMMUNICATIONS NETWORK

RELATED APPLICATIONS

This application claims the benefit of U.S. Provisional Patent Application Ser. No. 61/034,760, filed Mar. 7, 2008, the disclosure of which is incorporated herein by reference in its entirety.

TECHNICAL FIELD

The subject matter described herein relates to number portability services and short messaging service (SMS) messages directed to ported mobile device numbers. More specifically, the subject matter relates to methods, systems, and computer readable media for routing a message service message through a communications network.

BACKGROUND

A local wireless mobile network is typically able to send and receive message service messages, such as short messages service (SMS) messages, to and from a plurality of different foreign wireless mobile networks. For example, the communication of SMS messages between the different wireless mobile networks is made possible by utilizing a short message peer-to-peer protocol (SMPP) connection that couples the mobile networks' short message service centers (e.g., via SMPP gateways). By communicating SMPP messages containing SMS messages between short message service centers (SMSCs), SMS messages can be delivered to a receiving party subscribed to a foreign mobile network. For example, a mobile network operator can configure an SMSC to utilize receiving party number ranges to determine whether a receiving party is a subscriber of another mobile network operator as well as a subscriber of its own network. If the receiving party number is determined to be associated with the "home" mobile network, global system for mobile communications (GSM) protocol (or IS-41 protocol) can be used to deliver the SMS message. If the receiving party number is subscribed to a foreign mobile network, SMPP protocol is instead utilized for communicating the SMS message to an appropriate foreign mobile network SMSC.

Delivery of SMS messages by an SMSC typically requires that the SMSC query a Home Location Register (HLR) associated with the recipient mobile subscriber in order to determine a forwarding or delivery instructions associated with the message recipient. Location of the HLR to be queried is typically determined by an SMSC based on the recipient mobile a mobile subscriber identifier (e.g., MSISDN) that is contained in the SMS message being delivered. However, in number portability enabled telecommunication networking environments, the mobile subscriber identifier contained in the SMS message being delivered may have been ported into or out of the SMSC's network. This presents a problem for an SMSC that is attempting to deliver messages in a number portability enabled network environment.

One solution that has been implemented by a network operator to address this problem involves simply querying the network operator's HLR during each SMS delivery attempt. In cases where the recipient mobile subscriber has been ported out of or is not a subscriber of the home network, the HLR responds with an error message/code, which indicates that the message recipient is a foreign subscriber. The SMSC then forwards the SMS message to a foreign network based on the mobile subscriber identifier contained in the SMS message. In cases where the recipient mobile subscriber has been ported in or is a subscriber of the home network, the HLR responds with delivery instructions (e.g., serving mobile switching center address), which the SMSC uses to facilitate routing of the message towards the recipient mobile subscriber.

This solution, while operable, is highly inefficient with respect to the usage of HLR resources in the SMSC's home network. Each query transaction consumes expensive communication and processing bandwidth at the HLR. Hence, it is desirable from a network cost standpoint to minimize the number of HLR query transactions initiated by SMSC nodes in the home network.

Accordingly, a need exists for improved methods, systems, and computer readable media for efficiently routing a message service message through a communications network.

SUMMARY

Methods, systems, and computer readable media for routing a message service message through a communications network are disclosed. In one embodiment, the method includes, at a signaling node upstream from a sending party message server, receiving a message service message that includes a sending party identifier and a receiving party identifier. A number translation database is queried to determine a routing identifier associated with the receiving party identifier. The method also includes modifying the message service message to include the routing identifier, and routing the message service message to the sending party message server.

The subject matter described herein for routing a message service message may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for routing a message service message described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1:
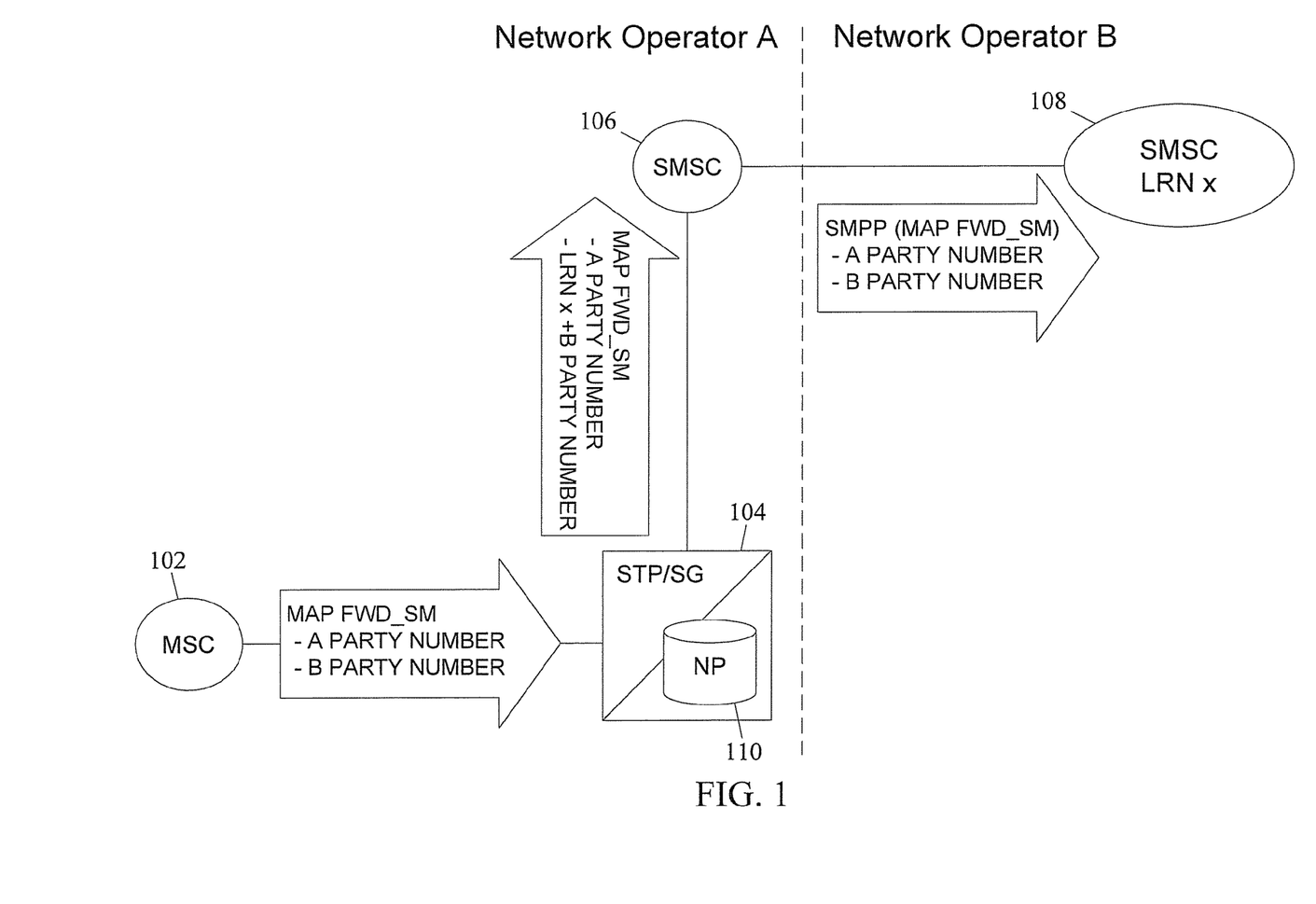
FIG. 1 is a network diagram including a signaling node for routing a message service message to a ported mobile device in accordance with one embodiment of the subject matter described herein.

FIG. 1 depicts a network diagram illustrating the routing of a message service message (e.g., a short message service (SMS) message) through a wireless networks. In one embodiment, the network may comprise both a home mobile network 100 and a foreign mobile network 101. More specifically, home mobile network 100 and foreign mobile network 101 may include separate and distinct mobile wireless networks. In FIG. 1, home mobile network 100 includes at least a mobile switching center (MSC) 102, a signaling node (e.g., signaling gateway (SG) 104), and a short message service center (SMSC) 106. Foreign network 101 similarly includes at least an SMSC 108, which is able to communicate with SMSC 106 using a short message peer-to-peer protocol (SMPP) connection (e.g., via SMPP gateways). In one embodiment, SG 104 may include a signaling transfer point (STP) or any like signaling node. Similarly, the SMSC may also include a multimedia service center (MMSC) or some other like message server.

In one embodiment, MSC 102 receives a request from a mobile device to send an SMS message (or any other kind of message service message) to a receiving party. The mobile device may be a subscriber to home mobile network 100 and the receiving party may include a mobile device that subscribes to foreign network 101. Upon receiving the request from the mobile device, MSC 102 may be configured to generate a mobile application part (MAP) forward short message (FWD_SM) message that includes at least the sending party number (or some other sending party identifier) associated with the sending mobile device and the receiving party number (or some other receiving party identifier) associated with the mobile device of the receiving party. Although FIG. 1 generally depicts a GSM network utilizing MAP FWD_SM messages, any other type of text message may be used. For example, SMS delivery point to point (SMDPP) messages may instead be utilized if home mobile network 100 includes an IS-41 network. The MAP message generated by MSC 102 is typically directed towards a "downstream" SMSC 106 so that SMSC 106 may query a home network home location register (HLR). In FIG. 1, however, the MAP message is initially received or intercepted by STP 104. In one embodiment, STP 104 is communicatively coupled to a number translation database, such as number portability (NP) database 110, which may be located within STP 104 (as shown in FIG. 1) or may be embodied as an external stand-alone database. Number portability database 110 may be provisioned or updated in any number of ways, such as periodically receiving NP data from a number portability provisioning service or agency (not shown in FIG. 1).

After receiving the MAP message from MSC 102, STP 104 may initiate a number portability query to NP database 110 using the receiving party number contained in the MAP message. As a result of the number portability query (e.g., performing a lookup), STP 104 may obtain a routing identifier related to the receiving party mobile device if the receiving party number has been previously ported. For example, the routing identifier may include data related to the network a ported receiving party is subscribed to (e.g., foreign mobile network 101), a network gateway associated with the receiving party's subscribed network, an SMSC in the receiving party's subscribed network, and the like. Specifically, the routing identifier may include, but is not limited to, data such as a location routing number (LRN), a service provider ID (SPID), or a carrier ID (CID).

After the routing identifier is obtained, STP 104 may subsequently modify the MAP message (or alternatively, create a new MAP message) so that the message includes the obtained routing identifier. In one embodiment, the routing identifier includes an LRN that is attached or appended to the receiving party number in the modified MAP FWD_SM message.

In one embodiment, STP 104 may be provisioned with a number translation module or application that is configured for receiving the MAP FWD_SM, querying the NP database, and subsequently, modifying the MAP FWD_SM message to include the routing identifier. After this modification, the MAP message may then be routed to SMSC 106. In one embodiment, STP 104 may include a message routing module or application for routing the MAP FWD_SM message to SMSC 106. In an alternate embodiment, the number translation module or application may be configured for routing the MAP FWD_SM message to SMSC 106. Although FIG. 1 represents the routing identifier as the LRN of SMSC 108, this depiction is understood to only represent an exemplary embodiment as other types of routing identifiers may be included in the modified MAP message.

After receiving the modified MAP message from STP 104, SMSC 106 may examine the receiving party number contained in the MAP message. In one embodiment, SMSC 106 may be configured (e.g., equipped with upgraded logic) to recognize that the receiving party number has been modified to include an appended LRN (or any other routing identifier). Upon recognizing the appended LRN, SMSC 106 forgoes querying the HLR. Rather than attempting to obtain location information from the HLR, SMSC 106 instead uses the routing identifier (e.g., LRN) to route the MAP FWD_SM message. Since the number portability service has already been performed by STP 104, SMSC 106 does not need to perform a query to either the HLR or a number portability database. Notably, this network configuration significantly reduces signaling traffic at both the SMSC and the HLR.

In one embodiment, SMSC 106 forwards the MAP FWD_SM message to SMSC 108, which is associated with the LRN, by including the MAP FWD_SM message in an SMPP message. For example, the MAP FWD_SM message may be encapsulated in the SMPP message to be delivered to SMSC 108. In an alternate embodiment, the SMPP message is generated by a home network SMPP gateway (not shown) and delivered to a foreign network SMPP gateway (not shown), which in turn routes the MAP FWD_SM message to SMSC 108.

Figure 2:
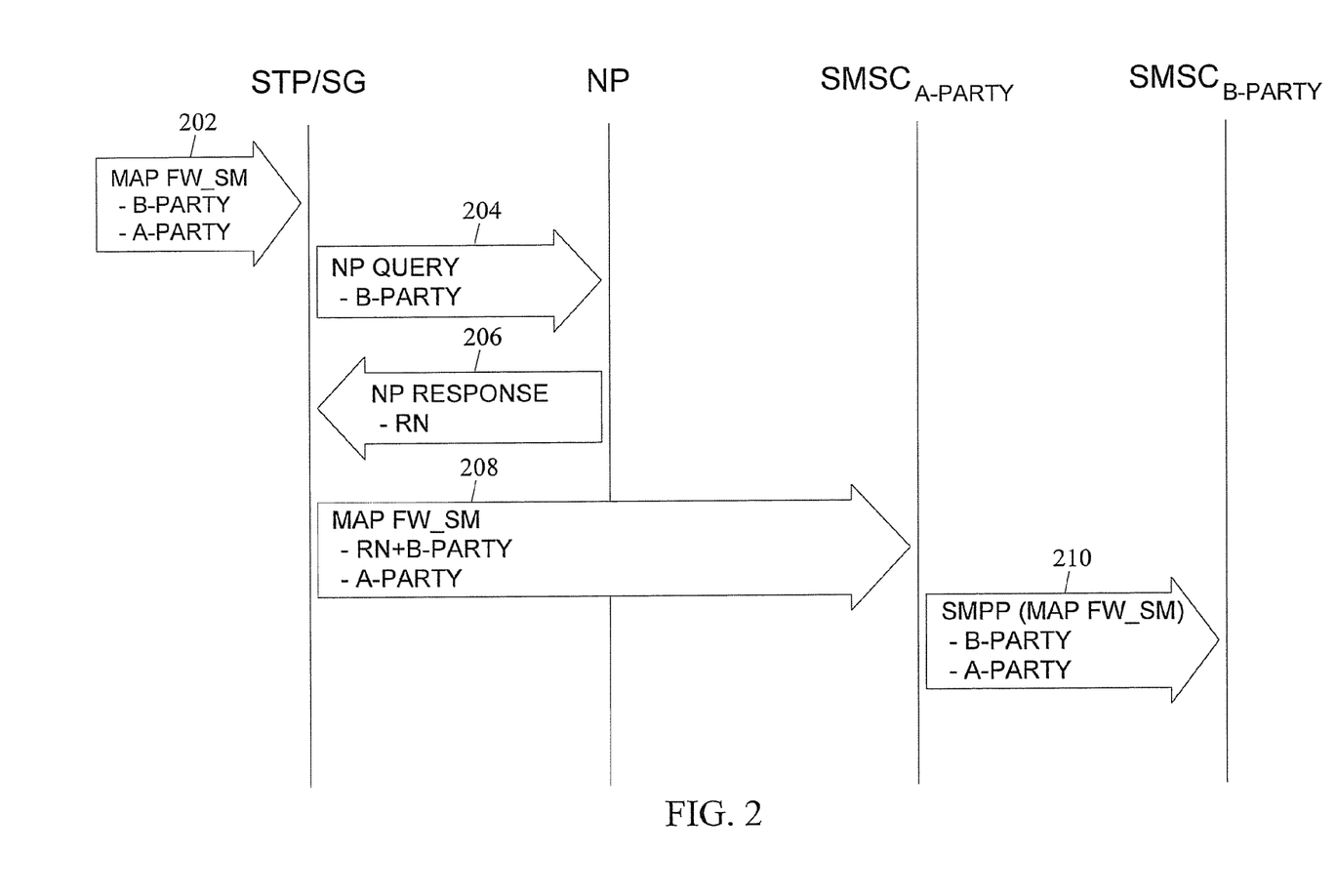
FIG. 2 is an exemplary call flow of utilizing a signaling node to route a message service message to a ported mobile device in accordance with one embodiment of the subject matter described herein.

FIG. 2 is an exemplary call flow that utilizes a signaling node to route a message service message to a ported mobile device. Namely, FIG. 2 depicts a MAP FW_SM message 202 that contains a sending party (i.e., A-party) identifier and a receiving party (i.e., B-party) identifier. In one embodiment, an STP/SG receives message 202 from an MSC (e.g., MSC 102 in FIG. 1). Instead of immediately routing message 202 to the home network SMSC (i.e., $SMSC_{A-Party}$), the STP/SG generates and sends a number portability query message 204 containing the receiving party number to an NP database. The NP database responds by sending, to the STP/SG, a response message 206 containing a routing number (RN) or some other identifier associated with the receiving party or the receiving party's subscribed network. In response, the STP/SG modifies the originally received MAP FWD_SM to include the obtained routing number as part of the receiving party address and sends modified message 208 to the home network's SMSC serving the sending party (i.e., A-party). Upon receipt, the home SMSC recognizes and reads the routing number from the modified MAP message (without querying an HLR or NP database) and generates an SMPP message 210. Notably, SMPP message 210 includes the MAP FWD_SM message that contains both the sending party and receiving party numbers, and is forwarded to the appropriate foreign SMSC as indicated by the routing number.

Figure 3:
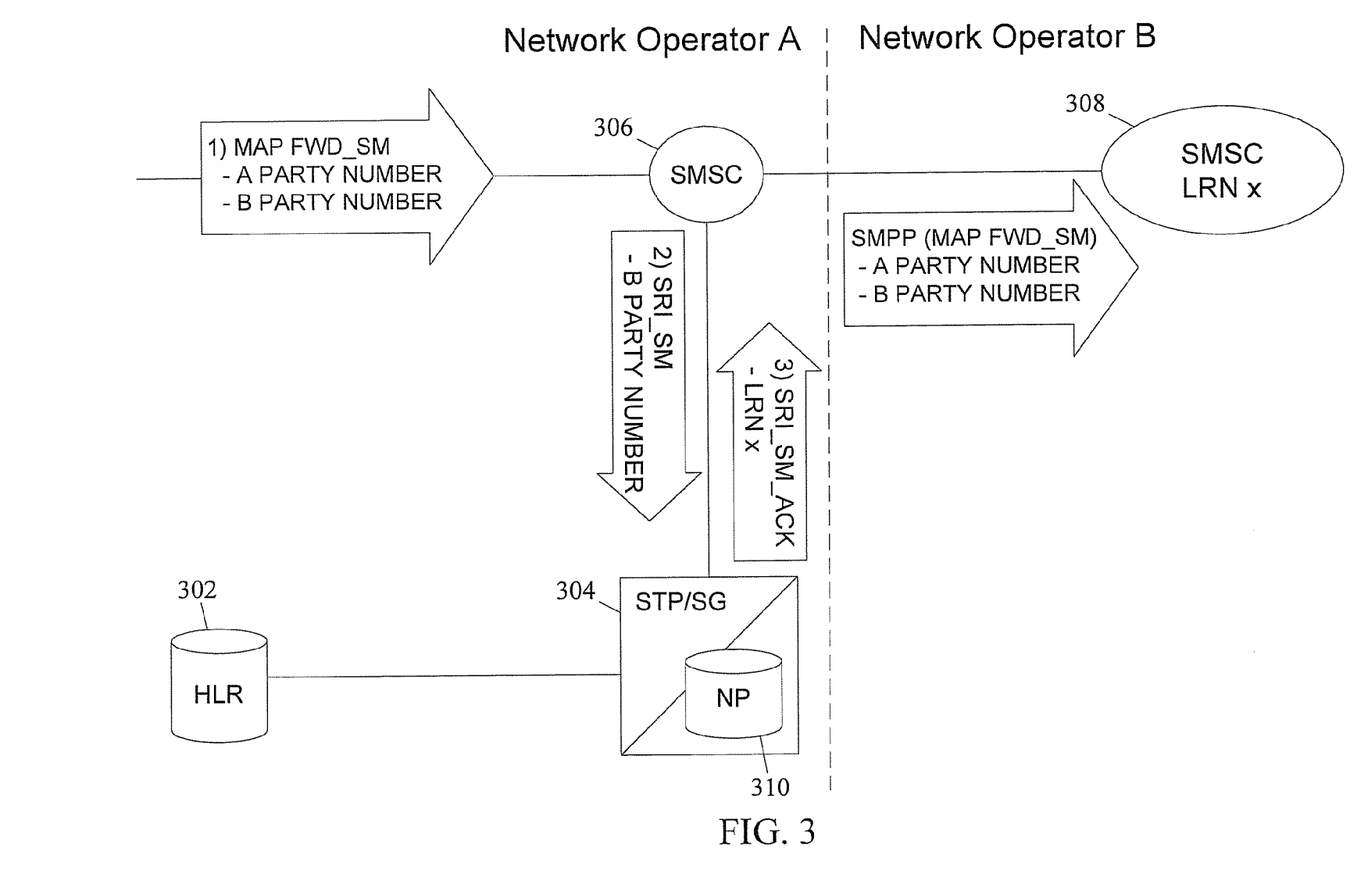
FIG. 3 is a network diagram including a signaling node for intercepting a send routing information SMS message (SRI_SM) associated with a message service message sent to a ported mobile device in accordance with one embodiment of the subject matter described herein.

FIG. 3 is a network diagram that includes a signaling node for intercepting a send routing information SMS message (SRI_SM) associated with a message service message sent to a ported mobile device. In one embodiment, the network comprises a home mobile network 300 and a foreign mobile network 301. In FIG. 3, home mobile network 301 includes a home location register (HLR) 302, a signaling node (e.g., signaling gateway (SG) 304), and a short message service center (SMSC) 306. Foreign network 301 similarly includes a SMSC 308, which is able to communicate with SMSC 306 using a short message peer-to-peer protocol (SMPP) connection (e.g., via SMPP gateways). In one embodiment, SG 104 may include a signal transfer point (STP). Similarly, the SMSC may also include a multimedia service center (MMSC) or some other like message server.

In one embodiment, SMSC 306 receives a request from a subscribing mobile device to send an SMS message (or any other type of message service message) to a receiving party. For example, SMSC 306 receives a MAP FWD_SM message that includes at the least a sending party number and receiving party number. SMSC 306 subsequently generates a sending routing information for short message (SRI_SM) query message, which is directed to HLR 302. Although FIG. 3 generally depicts a GSM network utilizing MAP SRI_SM messages, any like request message may be used. For example, SMSREQ messages may instead be utilized if home network 300 includes an IS-41 network.

In one embodiment, the SRI_SM query message may be received or intercepted by STP 304, which may be configured to recognize and process SRI_SM messages (e.g., equipped with upgraded logic). In one embodiment, STP 304 is also configured to query number portability database 310 to obtain a routing identifier (e.g., an LRN, SPID, CID, etc.) associated with the foreign mobile network 301 that provides service to a receiving party number that has been ported from network 300 to foreign network 301 (i.e., in this example, B-party is no longer a subscriber to network 300). In one embodiment, number portability database 310 may be provisioned or updated in any number of ways, such as periodically receiving NP data from a number portability provisioning service or agency.

After obtaining the identifier, STP 304 may generate a SRI_SM_Ack message that includes the identifier, such as an LRN as depicted in FIG. 3. In one embodiment, STP 304 then sends the SRI_SM_Ack message to SMSC 306 (i.e., without forwarding the SRI_SM message to HLR 302). By performing these functions, STP 304 responds on behalf, or in lieu, of HLR 302. After receiving the SRI_SM_Ack message, SMSC 306 may obtain the LRN from the acknowledgement message in order to determine where to route the originally received MAP FWD_SM message.

In one embodiment, SMSC 306 forwards the MAP FWD_SM message to SMSC 308, which is associated with the LRN, by including the MAP FWD_SM message in an SMPP message. For example, the MAP FWD_SM message may be encapsulated in the SMPP message to be delivered to SMSC 308. In an alternate embodiment, the SMPP message is generated by a home network SMPP gateway (not shown) and delivered to a foreign SMPP network gateway (not shown), which in turn routes the MAP FWD_SM message to SMSC 308.

Figure 4:
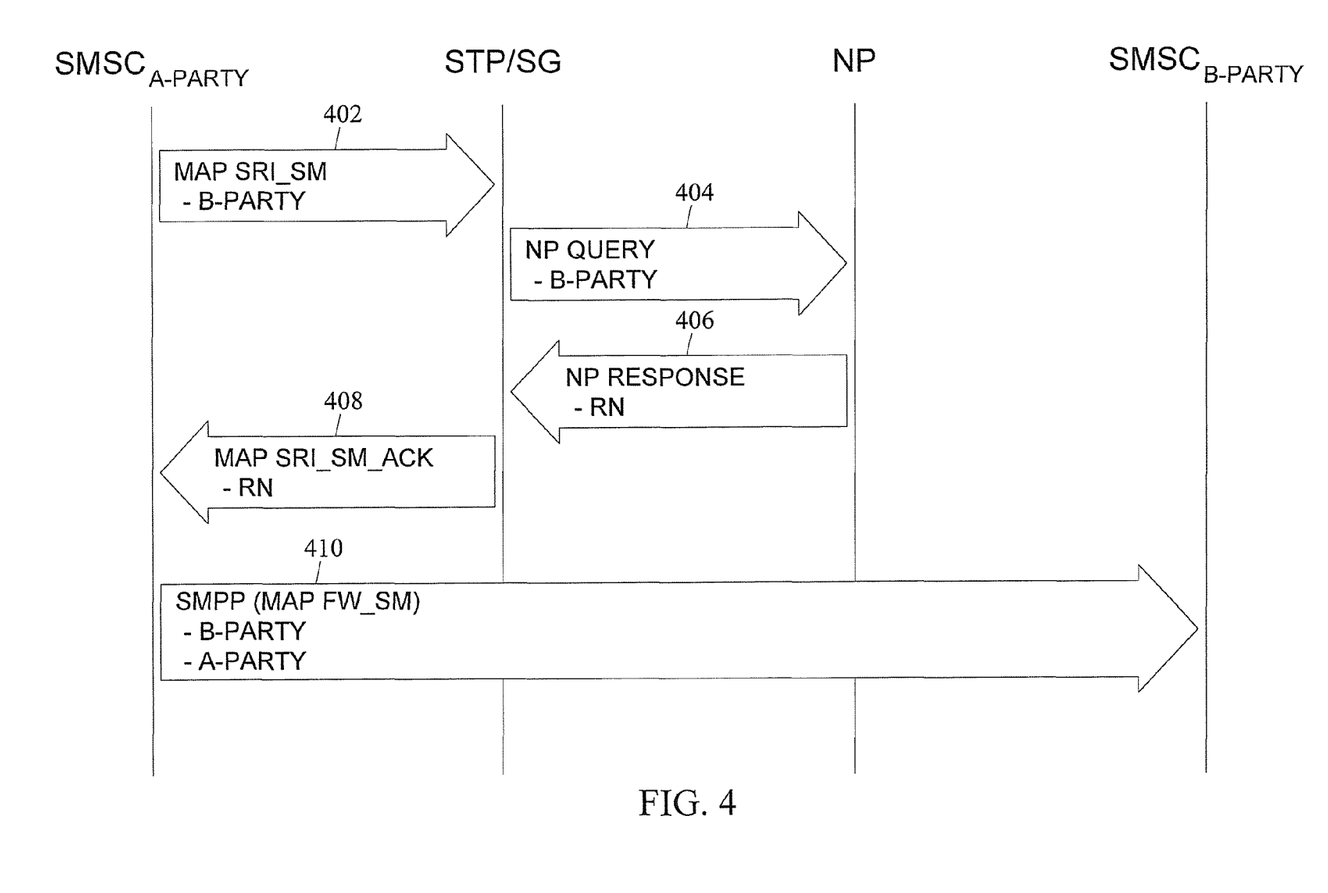
FIG. 4 is an exemplary call flow of utilizing a signaling node to intercept a send routing information SMS message (SRI_SM) associated with a message service message sent to a ported mobile device in accordance with one embodiment of the subject matter described herein.

FIG. 4 illustrates a call flow diagram that uses a signaling node to intercept an SRI_SM message associated with a message service message to a ported mobile device. Namely, FIG. 4 depicts a MAP SRI_SM message 402 that contains a receiving party (i.e., B-party) identifier being sent by a home network SMSC (i.e., $SMSC_{A\text{-}Party}$). In one embodiment, message 402 is sent to an STP/SG, or alternatively, is sent to an HLR and is instead intercepted by the STP/SG. The STP/SG then generates and sends a number portability query message 404 containing the receiving party number to a number portability database. The number portability database responds by sending, to the STP/SG, a response message 406 containing a routing number (RN) or other identifier associated with the mobile network serving the receiving party. In response, the STP/SG may generate a MAP SRI_SM_Ack message 408 that contains the routing number or identifier. Message 408 may then be provided to the $SMSC_{A\text{-}Party}$. The $SMSC_{A\text{-}Party}$ then generates an SMPP message 410 that includes the originally received MAP FW_SM message and the sending and receiving party numbers. SMPP message 410 may then be sent to a foreign network SMSC (i.e., $SMSC_{B\text{-}Party}$) that corresponds to the routing number received in message 408. Notably, $SMSC_{B\text{-}Party}$ is the SMSC that is providing service to the ported receiving party.

Figure 5:
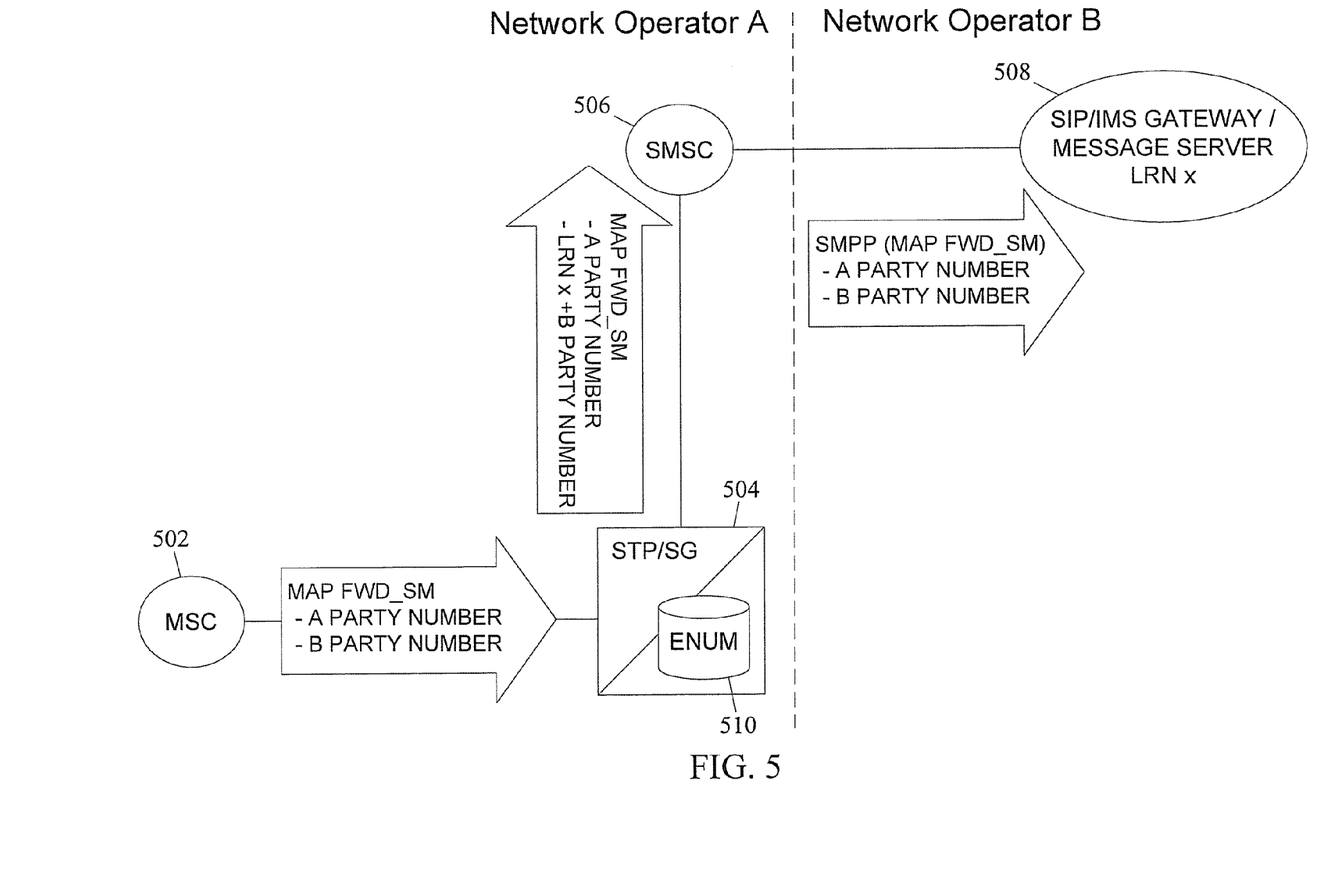
FIG. 5 is a network diagram including a signaling node that utilizes ENUM service to route a message service message to a mobile device in accordance with one embodiment of the subject matter described herein.

FIG. 5 depicts a network diagram that includes a signaling node utilizing an ENUM service to route a message service message to a mobile device that has been effectively "ported" from a 2G service network to a 3G service network. In one embodiment, the network comprises a home mobile network 500 and a foreign mobile network 501. Home mobile network 500 and foreign mobile network 501 may include separate and distinct mobile wireless networks. In FIG. 5, home mobile network 500 includes at least a mobile switching center (MSC) 502, a signaling node (e.g., signaling gateway (SG) 504), and a short message service center (SMSC) 506. In one embodiment, SG 504 may include a signaling transfer point (STP). Similarly, the SMSC may also include a multimedia service center (MMSC) or some other like message server. Foreign mobile network 501 may similarly include at least a foreign network gateway 508, which is able to communicate with network SMSC 506 using a short message peer-to-peer protocol (SMPP) connection (e.g., via SMPP gateways). In one embodiment, foreign network gateway 508 may include a session initiation protocol (SIP)/Internet protocol multimedia subsystem (IMS) gateway or some other like message server.

In one embodiment, MSC 502 receives a request from a mobile device to send an SMS message (or any other type of message service message) to a receiving party that may have formerly used a 2G device. The sending mobile device may be a subscriber to home mobile network 500 and the receiving party may now include a 3G mobile device that subscribes to foreign mobile network 501. Upon receiving the request from the sending mobile device, MSC 502 may be configured to generate a MAP FWD_SM message that includes at least the sending party number and the 2G receiving party number associated with the mobile device of the receiving party.

Although FIG. 5 generally depicts a GSM network utilizing MAP FWD_SM messages, any like text message may be used. For example, SMDPP messages may instead be utilized if home network 500 includes an IS-41 network. The MAP message is typically directed towards SMSC 506 in order to query a home network home location register (HLR). In FIG. 5, however, the MAP message is initially received by STP 504. In one embodiment, STP 504 is communicatively coupled to an ENUM translation database 510, which may be located within STP 504 (as shown in FIG. 5) or may be embodied as an external stand-alone database. ENUM translation database 510 may be provisioned or updated in any number of ways, such as periodically receiving ENUM data from an ENUM provisioning service or agency (not shown).

After receiving the MAP message from MSC 502, STP 504 may initiate an ENUM query to database 510 using the 2G receiving party number contained in the MAP message. As a result of the ENUM query, STP 504 may obtain at least one uniform resource identifier (URI) associated with the receiving party's 3G device. Specifically, the at least one URI may be mapped to a network routing address, such as an LRN, SPID, or CID, which is associated with a network gateway 508. In one embodiment, STP 504 may be provisioned with an ENUM translation module that is configured to query the ENUM translation database to obtain the at least one URI.

In one embodiment, STP 504 may utilize URI mapping to provide SMSC 506 with an appropriate network routing address (e.g., an LRN) of the network gateway that is servicing the receiving party in network 501. For example, STP 504 may modify the originally received MAP message (or alternatively, create a new MAP message) to include the recently obtained routing identifier. Notably, the routing identifier may include an LRN which is attached or appended to the receiving party number in the modified MAP FWD_SM message, which is then routed to SMSC 506.

After receiving the modified MAP message from STP 504, SMSC 506 may examine the receiving party number and LRN contained in the MAP message. In one embodiment, SMSC 106 may be configured (e.g., equipped with upgraded logic) to recognize that the receiving party number has been modified to include an appended LRN (or any other routing identifier). Upon recognizing the appended LRN, SMSC 506 forgoes querying the HLR. Rather, SMSC 506 uses the routing identifier (e.g., LRN) to route the MAP FWD_SM message. In one embodiment, SMSC 506 forwards the MAP FWD_SM message to foreign network gateway 508, which is associated with the LRN, by including the MAP FWD_SM message in an SMPP message. For example, the MAP FWD_SM message may be encapsulated in the SMPP message to be delivered to SIP gateway 508.

Figure 6:
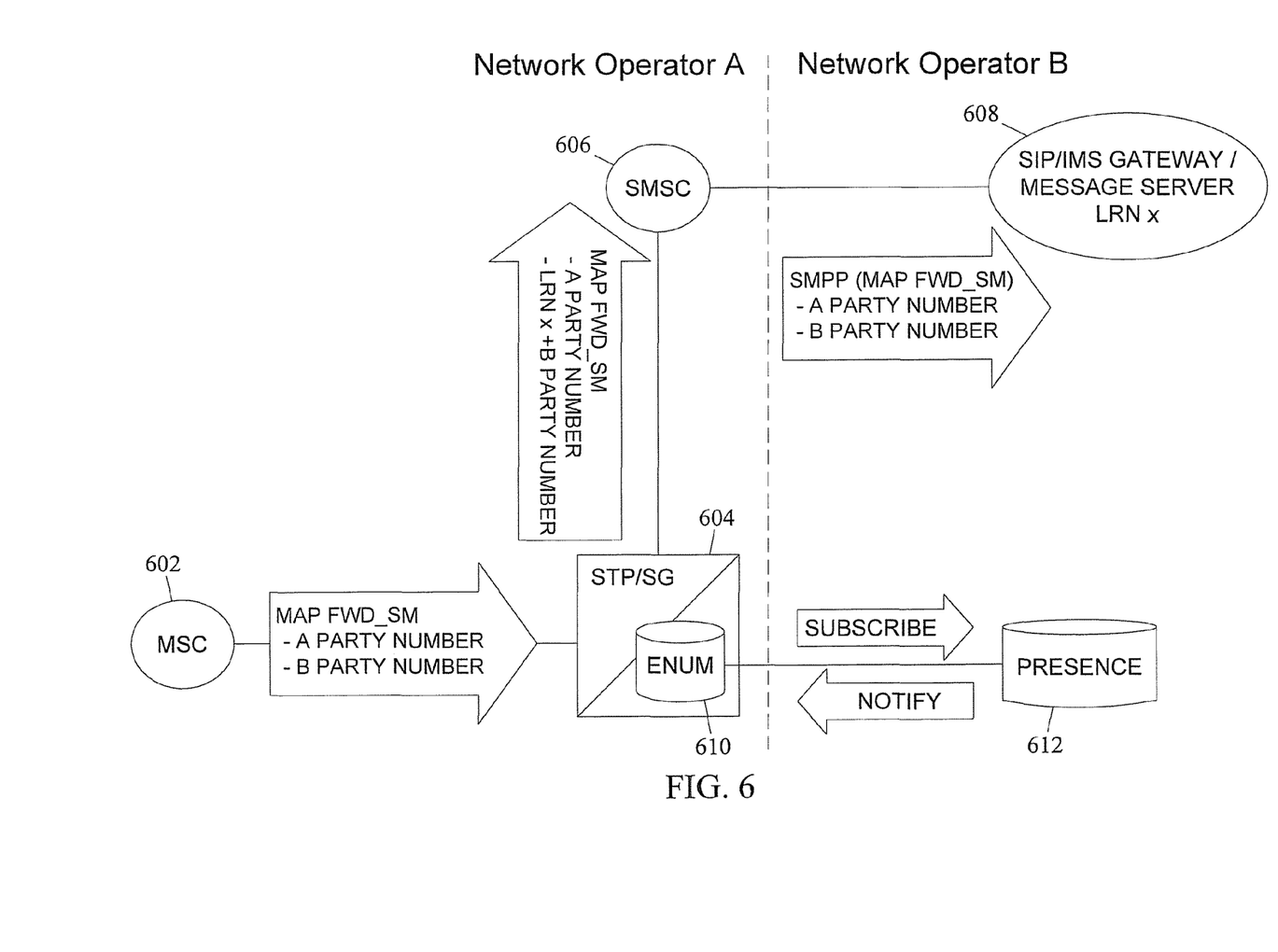
FIG. 6 is a network diagram including a signaling node that utilizes presence information to route a message service message to a mobile device in accordance with one embodiment of the subject matter described herein.

FIG. 6 depicts a network diagram including a signaling node that utilizes presence status information to route a message service message to a mobile device. In one embodiment, the network comprises a home mobile network 600 and a foreign mobile network 601. In FIG. 6, home network 601 includes a home location register (HLR) 602, a signaling node (e.g., signaling gateway (SG) 604), a short message service center (SMSC) 606, and a presence database 612. In one embodiment, SG 604 may include a signaling transfer point (STP). Similarly, the SMSC may also include a multimedia service center (MMSC) or some other like message server. Foreign mobile network 501 may similarly include at least a foreign network gateway 608, which is able to communicate with network SMSC 606 using a short message peer-to-peer protocol (SMPP) connection (e.g., via SMPP gateways). In one embodiment, foreign network gateway 608 may include a SIP/IMS entity, such as an SIP/IMS gateway or other like message server.

In one embodiment, MSC 602 receives a request from a mobile device to send an SMS message to a receiving party that may have formerly used a 2G device. The sending mobile device may be a subscriber to home mobile network 600 and the receiving party may now include a 3G mobile device that subscribes to foreign mobile network 601. Upon receiving the request from the sending mobile device, MSC 602 may be configured to generate a MAP FWD_SM message that includes at least the sending party number and 2G receiving party number associated with the mobile device of the receiving party. Although FIG. 6 generally depicts a GSM network utilizing MAP FWD_SM messages, any like text message may be used. For example, SMDPP messages may instead be utilized if home network 600 includes an IS-41 network. The MAP message is typically directed towards SMSC 606 in order to query a home network home location register (HLR). In FIG. 6, however, the MAP message is initially received by STP 604. In one embodiment, STP 604 is communicatively coupled to an ENUM/NP database 610, which may be located within STP 604 (as shown in FIG. 6) or may be embodied as an external stand-alone database. Similarly, the ENUM/NP database 610 may be embodied as separate and distinct ENUM and NP databases that are respectively connected to STP 604. ENUM/NP database 610 may be provisioned or updated in any number of ways, such as periodically receiving ENUM and NP data from a respective ENUM and number portability provisioning service or agency (not shown). In one embodiment, ENUM and NP services may both be utilized by a network 600 if a home network operator has a preference to deliver SMS messages by utilizing 3G SIP services before attempting to send text messages using 2G GSM services.

After receiving the MAP message from MSC 602, STP 604 may initiate an ENUM query to database 610 using the 2G receiving party number contained in the MAP message. In one embodiment, STP 604 obtains a URI identifier in response to the ENUM query. The URI identifier may be mapped to a network routing address, such as an LRN, SPID, CID, or the like, which is associated with foreign network gateway 608. In one embodiment, the receiving party's availability (i.e., "presence status") may be determined by sending a "subscribe message" containing the obtained URI to a presence service query/subscription, which is represented in FIG. 6 as a presence database 612.

As used herein, a "presence service" is a service that provides for the monitoring of the availability and disposition of services and/or addresses identified by URIs. Presence information is highly dynamic and generally characterizes whether a user is online or offline, busy or idle, away from communications devices or nearby, and the like. Presence status information is typically stored in a presence database, such as database 612. In order to obtain presence information regarding a receiving party, a subscribing entity (i.e., network 600 via STP 604) may send a subscribe message to presence database 612. If presence information for the subscribed-to receiving party is available in presence database 612, presence database 612 (or a server that hosts database 612) will respond with presence information for the receiving party.

Thus, if the receiving party's mobile device associated with the URI is available to receive an SMS message, then presence database 612 will send a notification message (i.e., a notify message) to STP 604 indicating the receiving party's availability. Similarly, database 612 may also be configured to send a notification message to STP 604 indicating that the receiving party is not available for receiving SMS messages if that is the case.

In one embodiment, STP 604 modifies the originally received MAP message (or alternatively, create a new MAP message) to include the recently obtained routing identifier. For example, the routing identifier may include an LRN which is attached or appended to the receiving party number in the modified MAP FWD_SM message, which is then routed to SMSC 606.

In one embodiment, SMSC 606 receives the modified MAP message and examines the receiving party number. SMSC 606 may then use the routing identifier (e.g., LRN) to determine where to route the MAP FWD_SM message. In one embodiment, SMSC 606 forwards the MAP FWD_SM message to foreign network gateway 608, which is associated with the LRN, using SMPP. More specifically, SMSC 606 forwards the MAP FWD_SM message to gateway 608 by including the MAP FWD_SM message in an SMPP message. For example, the MAP FWD_SM message may be encapsulated in the SMPP message to be delivered to gateway 608. In an alternate embodiment, the SMPP message is generated by a home network SMPP gateway and delivered to a foreign SMPP network gateway, which in turn routes the MAP FWD_SM message to gateway 608. In yet another embodiment, SMDPP messages may be used in an IS-41 network as opposed to GSM MAP FWD_SM messages.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for routing a message service message through a communications network, the method comprising:
    at a signaling node upstream from a sending party message server:
        receiving an original message service message that includes a sending party identifier and a receiving party identifier, wherein the original message service message is a mobile application part (MAP) forward short message (FWD_SM) message;
        querying a number translation database to determine a routing identifier associated with the receiving party identifier, wherein the routing identifier identifies a receiving party message server;
        modifying the MAP FWD_SM message to include the routing identifier; and
        routing the modified MAP FWD_SM message to the sending party message server, wherein the sending party message server is configured to use the routing identifier to deliver the modified MAP FWD_SM message to the receiving party message server.

2. The method of claim 1 wherein the signaling node upstream from the sending party message server comprises a signal transfer point (STP).

3. The method of claim 1 wherein the signaling node upstream from the sending party message server comprises a signaling gateway (SG).

4. The method of claim 1 wherein querying a number translation database includes performing a lookup in a number portability database, and wherein the router identifier comprises at least one of a location routing number (LRN), a service provider ID (SPID), and a carrier ID (CID).

5. The method of claim 1 wherein querying a number translation database includes performing a lookup in an E.164 number mapping (ENUM) translation database, and wherein the routing identifier comprises a uniform resource identifier (URI).

6. The method of claim 5 wherein performing a lookup in an ENUM translation database includes obtaining at least one uniform resource identifier (URI) address that is associated with the receiving party identifier.

7. The method of claim 6 including determining whether the receiving party associated with the URI is available to receive the message service message.

8. The method of claim 7 wherein determining whether the receiving party associated with the URI is available to receive a message service message includes querying a presence server to obtain presence status information associated with the URI.

9. The method of claim 1 wherein querying a number translation database includes querying a number translation database within the signaling node.

10. The method of claim 1 wherein querying a number translation database includes querying a number translation database external to the signaling node.

11. The method of claim 1 wherein querying a number translation database includes performing a lookup to obtain a routing number associated with a session initiation protocol/Internet protocol multimedia subsystem (SIP/IMS) network entity.

12. The method of claim 11 where the SIP/IMS network entity is a SIP/IMS gateway node.

13. A method for processing a request for message service message routing information, the method comprising:
    at a signaling node separate from a sending party home location register (HLR):
        receiving, from a sending party message server, a request message for message service message routing information for routing a message service message to a receiving party, wherein the message service message is a mobile application part (MAP) forward short message (FWD_SM) message;
        performing, in a number translation database, a lookup based on a receiving party identifier in the request message, and locating a routing identifier for a receiving party message server, wherein the receiving party message server is a short message serving center (SMSC); and
        sending a response message containing the routing identifier for the receiving party message server to the sending party message server, wherein the sending party message server is configured to use the routing identifier to deliver the message service message to the receiving party message server.

14. A system for routing a message service message through a communications network, the system comprising:
    a signaling node for operating upstream from a sending party message server, the signaling node including:
        a number translation module for:
            receiving an original message service message including a sending party identifier and a receiving party identifier, wherein the original message service message is a mobile application part (MAP) forward short message (FWD_SM) message;
            querying a number translation database to determine a routing identifier associated the receiving party identifier, wherein the routing identifier identifies a receiving party message server; and modifying the MAP FWD_SM message to include the routing identifier; and a message routing module for routing the modified MAP FWD_SM message service message to a message server associated with the sending party identifier, wherein the sending party message server is configured to use the routing identifier to deliver the modified MAP FWD_SM message to the receiving party message server.

15. The system of claim 14 wherein the signaling node comprises a signal transfer point (STP).

16. The system of claim 14 wherein the node comprises a signaling gateway (SG).

17. The system of claim 14 wherein the number translation module comprises a number portability translation module, and wherein the routing identifier comprises at least one of a location routing number (LRN), a service provider ID (SPID), and a carrier ID (CID).

18. The system of claim 14 wherein the number translation module comprises an E.164 number mapping (ENUM) translation module and the number translation database includes an ENUM translation database, and wherein the routing identifier comprises a uniform resource identifier (URI).

19. The system of claim 18 wherein querying the ENUM translation database includes obtaining at least one uniform resource identifier (URI) address associated with the receiving party identifier.

20. The system of claim 19 wherein the ENUM translation module is further configured to determine whether the receiving party associated with the at least one URI is available to receive a message service message.

21. The system of claim 20 wherein the ENUM translation module is determines whether the receiving party associated with the at least one URI is available to receive a message service message by querying a presence server to obtain presence status information for the URI.

22. A system for processing a request for message service message routing information, the system comprising:

a signaling node separate from a sending party home location register (HLR), the signaling node including:
a number translation module for:
receiving, from a sending party message server, a request message for message service message routing information for routing a message service message to a receiving party, wherein the message service message is a mobile application part (MAP) forward short message (FWD_SM) message;
performing, in a number translation database, a lookup based on a receiving party identifier in the request message, and locating a routing number for a receiving party message server; and
sending a response message containing the routing number for the receiving party message server to the sending party message server, wherein the sending party message server is configured to use the routing number to deliver the MAP FWD_SM message to the receiving party message server.

* * * * *